(12) United States Patent
San Miguel Alzórriz et al.

(10) Patent No.: US 11,512,678 B2
(45) Date of Patent: Nov. 29, 2022

(54) WIND TURBINE ROTOR BLADE HAVING A SHEAR WEB

(71) Applicant: Nordex Energy Spain S.A.U., Barásoain (ES)

(72) Inventors: Unai San Miguel Alzórriz, Ilarratz Esteribar (ES); Fernando Echeverría Durá, Pamplona (ES); Álvaro Gorostidi Martínez De Lecea, Pamplona (ES)

(73) Assignee: Nordex Energy Spain S.A.U., Barásoain (ES)

( * ) Notice: Subject to any disclaimer, the term of this patent is extended or adjusted under 35 U.S.C. 154(b) by 0 days.

(21) Appl. No.: 17/223,834

(22) Filed: Apr. 6, 2021

(65) Prior Publication Data

US 2021/0310460 A1    Oct. 7, 2021

(30) Foreign Application Priority Data

Apr. 6, 2020   (EP) .................................... 20382274

(51) Int. Cl.
   *F03D 1/06*   (2006.01)
(52) U.S. Cl.
   CPC ......... *F03D 1/0683* (2013.01); *F03D 1/0658* (2013.01); *F05B 2240/307* (2020.08)
(58) Field of Classification Search
   CPC .... F03D 1/0633; F03D 1/0641; F03D 1/0675; F03D 1/0683; F03D 1/0658; F05B 2240/307
   See application file for complete search history.

(56) References Cited

U.S. PATENT DOCUMENTS

| 9,879,541 B2 | 1/2018 | Torgard |
| 2010/0062238 A1* | 3/2010 | Doyle .................. B29C 70/342 416/223 R |

(Continued)

FOREIGN PATENT DOCUMENTS

| DE | 20 2013 007 886 U1 | 12/2014 |
| DE | 202013007886 U1 * | 1/2015 ........... F03D 1/0633 |

(Continued)

OTHER PUBLICATIONS

Machine translation of DE 202013007886U1; retrieved from Espacenet on Feb. 11, 2022 (Year: 2022).*

(Continued)

*Primary Examiner* — Courtney D Heinle
*Assistant Examiner* — Sang K Kim
(74) *Attorney, Agent, or Firm* — Walter Ottesen, P.A.

(57) ABSTRACT

A wind turbine rotor blade including a blade tip, a blade root, the root defining a z-axis of a right-handed coordinate system, a shell having a leading edge, a trailing edge, a pressure side, a suction side, and, at a longitudinal position close to the tip, an aerodynamic profile with a chord and a profile height. The chord defines a y-axis. The profile height defines an x-axis. A carrying structure including a shear web connects the pressure and suction side. The blade has a prebend towards the pressure side such that the tip is offset from the z-axis along the x-axis. The blade has a sweep towards the trailing edge such that the tip is offset from the z-axis along the direction of the y-axis. The shear web defines a plane including the z-axis or has a constant distance therefrom and is inclined relative to the x-axis.

12 Claims, 4 Drawing Sheets

(56) References Cited

U.S. PATENT DOCUMENTS

| | | |
|---|---|---|
| 2010/0104444 A1 | 4/2010 | Garcia Andujar et al. |
| 2011/0176928 A1* | 7/2011 | Jensen .................... F03D 3/062 |
| | | 416/233 |
| 2014/0234115 A1* | 8/2014 | Schibsbye ............... F01D 5/141 |
| | | 416/226 |
| 2016/0177915 A1* | 6/2016 | Gonzalez ............. F03D 1/0675 |
| | | 416/223 R |
| 2017/0122287 A1* | 5/2017 | Dobbe .............. B29C 66/00145 |

FOREIGN PATENT DOCUMENTS

| | | |
|---|---|---|
| EP | 2169217 A1 | 3/2010 |
| EP | 2781734 A1 | 9/2014 |
| EP | 3486476 A1 | 5/2019 |
| WO | 2014/127923 A1 | 8/2014 |

OTHER PUBLICATIONS

Extended Search Report of the European Patent Office dated Oct. 7, 2020 in European patent application 20382274.7 on which the claim of priority is based.

\* cited by examiner

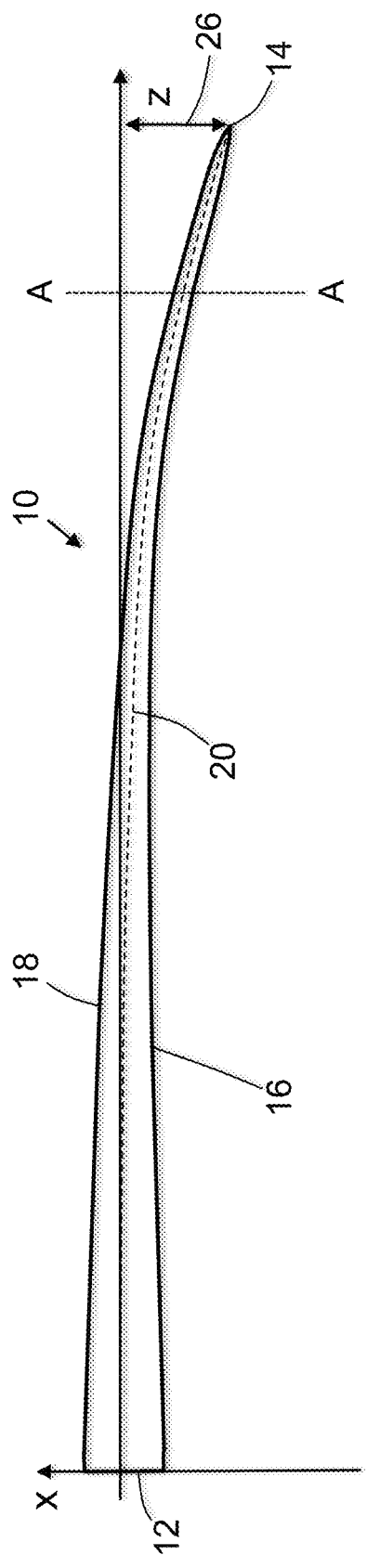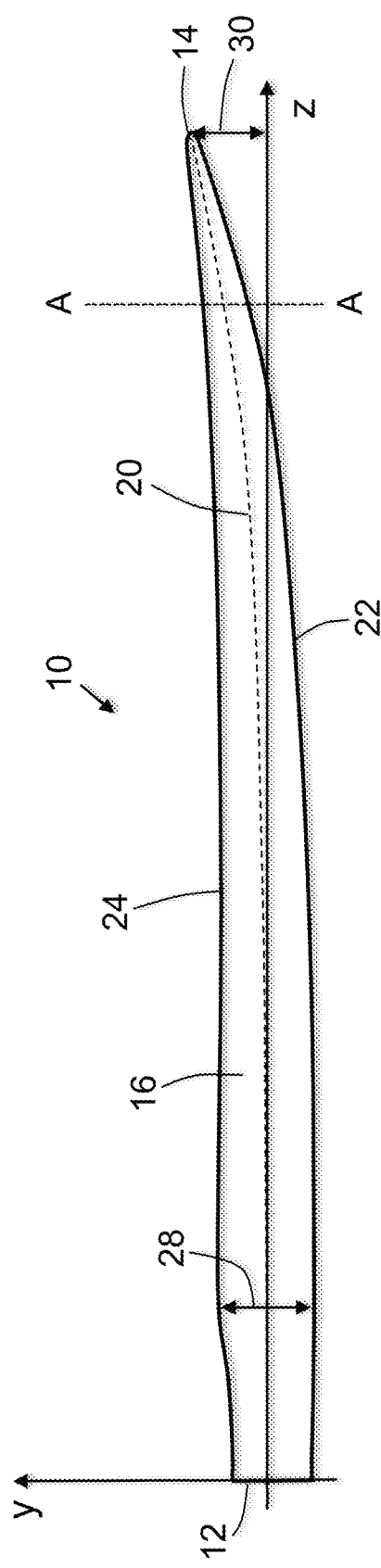
Fig. 1
Fig. 2

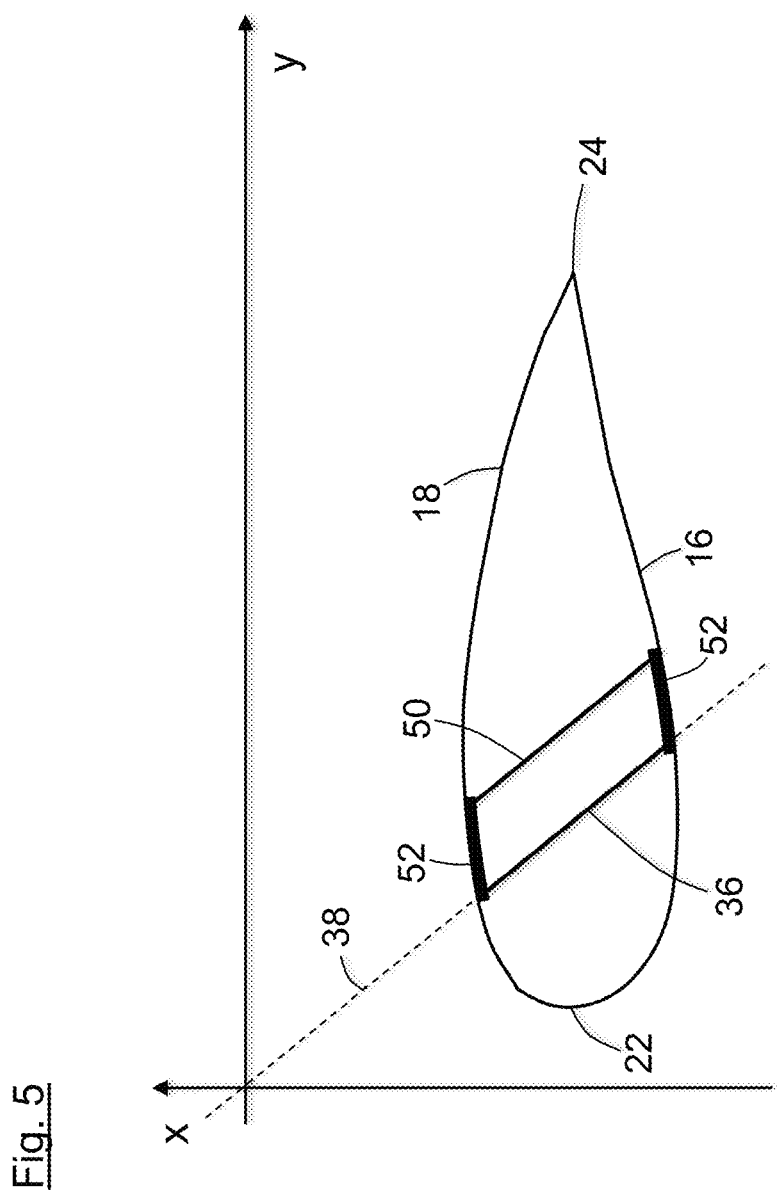

WIND TURBINE ROTOR BLADE HAVING A SHEAR WEB

CROSS REFERENCE TO RELATED APPLICATION

This application claims priority of European patent application no. 20 382 274.7, filed Apr. 6, 2020, the entire content of which is incorporated herein by reference.

TECHNICAL FIELD

The disclosure relates to a wind turbine rotor blade with an aerodynamic shell and a load carrying structure. Wind turbine rotor blades have to fulfil different, often contradictory requirements with regard to aerodynamic performance and structural stability. For example, for optimum aerodynamic performance, it is often desired to configure long, slender blades. This in turn makes the blades relatively flexible, so that it is more difficult to obtain the required stiffness to prevent tower strikes et cetera.

BACKGROUND

Different concepts have been suggested addressing the risk of tower strikes. Some rotor blades have a prebend for increasing the distance between the blade tip portion and the tower in order to prevent tower strikes. Only under aerodynamic load, these rotor blades deform towards a straight configuration. Such a prebend can be combined with rotor blades attached to a rotor hub such that the pitch axis is placed within the rotor plane. In an alternative, possibly in combination with a prebend, the hub is formed such that the pitch axis is inclined with reference to the rotor plane, so that the blades are rotating on a cone rather than in a plane.

Other approaches focus on increasing the stiffness of the blade, for example, by applying fiber materials with a very high elongation at breakage, also in combination with pultrusion, or by optimizing geometrical parameters such as the profile height.

With regard to the loads acting on the rotor blade, it is known to provide the blades with a curvature essentially in the rotor plane, referred to as a sweep. Under aerodynamic load, this leads to a certain twisting of the tip section of the blades, so that loads can be reduced by reducing the angle of attack and hence the aerodynamic lift. This concept is sometimes referred to as passive load reduction.

From the documents DE 20 2013 007 886 U1 and EP 2 781 734 B1, wind turbine rotor blades with a sweep and a load carrying structure comprising two longitudinal sections being connected to each other have become known.

From the document EP 2 169 217 A1, wind turbine rotor blades with a geometric axis describing specific curves corresponding to a sweep and to a prebend have become known.

From the document WO 2014/127923 A1, a radially twisted wind turbine rotor blade has become known. It has a load carrying structure including a twisted shear web.

SUMMARY

It is an object of the invention to provide a wind turbine rotor blade that has favorable aerodynamic and structural characteristics and is particularly easy to manufacture.

This object can, for example, be achieved by the wind turbine rotor blade having
  a blade tip,
  a blade root for attachment to a rotor hub, the blade root defining a z-axis of a right-handed coordinate system,
  an aerodynamic shell having a leading edge, a trailing edge, a pressure side, a suction side, and, at a longitudinal position close to the blade tip, an aerodynamic profile with a chord and a profile height, the chord defining a direction of a y-axis of the right-handed coordinate system and the profile height defining a direction of an x-axis of the right-handed coordinate system, and
  a load carrying structure including a shear web connecting the pressure side and the suction side, wherein
  the wind turbine rotor blade has a prebend towards the pressure side such that the blade tip is offset from the z-axis along the direction of the x-axis,
  the wind turbine rotor blade has a sweep towards the trailing edge such that the blade tip is offset from the z-axis along the direction of the y-axis,
  the shear web is a planar shear web defining a shear web plane,
  the shear web plane comprises the z-axis or has a constant distance therefrom, and
  the shear web plane is inclined with regard to the x-axis.

The wind turbine rotor blade may be adapted for attachment to a rotor having a horizontal axis and two or more, in particular three blades. The rotor may be operated at variable speed. The rotor may have a pitch drive for controlling the pitch angle of the rotor blades. Measured from the blade root to the blade tip, the rotor blade may have a length of at least 60 m, at least 75 m, at least 90 m or at least 100 m.

The wind turbine rotor blade has a blade root for attachment to a rotor hub, in particular to a rotatable member of a pitch bearing of the rotor hub. The blade root may be provided with fastening means such as nuts or threaded inserts embedded into the blade root or fastened in suitable receptacles of the blade root. In cross section, the blade root may be circular or almost circular. An end of the blade root facing the hub defines a connection plane. The geometry of the blade root, in particular an end face of the blade root to be connected to a rotor hub, defines the z-axis of a right-handed coordinate system. The origin of the coordinate system may be chosen in the connection plane. If a pitch system is used, the z-axis may be identical to a pitch axis of the rotor blade, but may also differ therefrom when a pitch bearing of the pitch system is conical. The rotor blade may be used as well with a wind turbine operated at fixed pitch.

In this application, the direction of the y-axis is chosen to correspond with the chord line of an aerodynamic profile placed at a longitudinal position close to the blade tip. The x-axis is placed orthogonal to the y-axis such that its direction essentially corresponds to the profile height of the aerodynamic profile. Another selection of the y-axis direction often applied refers to the pitch angle of the wind turbine blade at which maximum power is obtained when the rotor is operated at its design tip speed ratio. By convention, this pitch angle is sometimes referred to as 0°. The convention used in this application may differ by a few degrees, but also means that in partial load operation, the y-axis is close to the rotor plane. The x-axis then points essentially towards a tower center line. When the rotor blade is in feather position, the y-axis and hence the trailing edge point towards the tower center line.

The rotor blade has a prebend and a sweep, so that it has a curvature with components in the x-z plane as well as in the y-z plane. The load carrying structure must follow this complex curvature, which usually requires using load carrying structure elements of a complex shape. With regard to the shear webs, one would expect it was inevitable to configure these with an out-of-plane curvature.

The shear web is a large planar member connected to the pressure side and the suction side of the aerodynamic shell. These connections may be made by gluing. For good distribution of forces and good bonding, the upper and lower ends (facing the suction side and the pressure side, respectively) of the shear web may each be equipped with a flange extending transversely in one or both directions, so that the shear web may have a C-shaped or I-shaped cross section. The shear web can be a sandwich construction with a core material placed between two top layers of a fiber reinforced plastics material.

The inventors realized that a planar shear web can be used when the shear web is arranged in a shear web plane which comprises the z-axis or has a constant distance therefrom, and which is inclined with regard to the x-axis. In this case, the shear web plane can be arranged such that its "catches" the course of the rotor blade. The complex curvature of the blade is then essentially mapped within the shear web plane. The shear web does not need an out-of-plane curvature.

This facilitates manufacturing of the wind turbine blade, first because the shear web, which is a large and complex part, can be made by standard processes. No molds or other forms with a complex shape are needed. Second, the planarity of the shear web makes handling of the shear web, installation into the blade and possibly storage of the shear web far easier.

Another important advantage relates to manufacturing as well. When assembling wind turbine rotor blades, it is common practice to maintain a first part of the blade in its manufacturing mold, for example, a part of the aerodynamic shell such as a half shell, and to position the shear web within this first part. To this end, the shear web is usually lowered in a vertical orientation by means of a hoisting device and then placed on and connected to an inner surface of the first part. Due to this process, the vertical orientation of the shear web determines how the first part must be aligned with regard to the vertical direction, so that the orientation of the mold in which the first part is built is determined as well. In accordance with the disclosure, however, the desired inclination of the shear web plane with reference to the x-axis, when following the above process and positioning the shear web vertically in the manufacturing plant, leads to a corresponding inclination of the first part. The inventors noticed that this inclination of the mold can facilitate manufacturing of the first part, because the mold's inner surface, which follows the curvature of the aerodynamic profile, can be positioned closer to a horizontal plane, in particular in critical regions close to the leading edge. This facilitates placing of the reinforcing fibers in the mold and maintaining them exactly in the desired position.

According to an aspect of the disclosure, the shear web plane forms an angle with the x-axis in the range of 10° to 45°. Selecting an angle in this range allows carrying out embodiments of the invention for most useful combinations of sweep and prebend. At the same time, a mold for manufacturing the mentioned first part can be placed at a suitable orientation to facilitate fiber layup.

According to an aspect of the disclosure, the shear web extends over a large part of a length of the rotor blade, including a longitudinal section having the sweep and/or the prebend. The large part covered by the shear web may correspond to at least 50%, at least 70% or at least 90% of the length of the wind turbine rotor blade. The longitudinal section may extend to a longitudinal position close to the blade tip, the longitudinal position having a distance of, for example, less than 2 m or less than 1 m from the blade tip. The shear web may even extend from a longitudinal position close to the blade root to a longitudinal position close to the blade tip. In any event, the advantages of the disclosure can be obtained over a substantial part of the blade's length, in particular in a region near the blade tip, where most of the curvature is found.

According to an aspect of the disclosure, the rotor blade has one or more further shear webs, wherein each further shear web is planar and arranged in a plane parallel to the shear web plane. In some cases, the load carrying requirements can best be fulfilled by a double shear web configuration, wherein a pair of shear webs is placed close to a chord position where the aerodynamic profile has its maximum profile height, or by a configuration having (in addition to a single shear web or to the double shear web) a further shear web closer to the trailing edge. Wherever the further shear webs are placed, their parallel alignment with reference to the shear web allows to obtain the advantages described for the shear web for the further shear webs as well.

According to an aspect of the disclosure, the aerodynamic shell comprises a suction side half shell and a pressure side half shell. Both half shells are connected over the shear web and possibly one or more further shear webs, and glued together at the leading edge and the trailing edge. One of the half shells may correspond to the first part manufactured in a mold and may be connected to the shear web when still being positioned in that mold.

According to an aspect of the disclosure, the load carrying structure comprises two spar caps connected to each other by the shear web. The spar caps may be made of unidirectional fiber layers of, for example, glass or carbon fibers, also in combination with pultrusion.

According to an aspect of the disclosure, the spar caps are integrated into the half shells. In particular, each of the spar caps can be placed in a mold together with other fiber materials forming the shells and being infused with a liquid plastics material. In such an infusion setting, dry fibers, pre-impregnated fibers as well as pultruded and pre-cured fiber materials can be integrated. In the alternative, the spar caps and the aerodynamic shells can be manufactured separately and joined to each other and to the shear web in a separate step. No matter how the shear web is actually connected to the shell and/or to the spar caps, the shear web always connects the pressure side and the suction side of the rotor blade.

According to an aspect of the disclosure, a reference line of the rotor blade extends from the blade root to the blade tip within the aerodynamic shell and has a sweep and a prebend. The concept of a reference line is commonly used to describe the shape of wind turbine rotor blades, where the reference line is sometimes referred to as longitudinal axis, guiding curve, or feather curve. In particular, the reference line may correspond to the aerodynamic or structural centers of the rotor blade's cross sections.

According to an aspect of the disclosure, the reference line is a planar curve. In other words, the reference line is arranged in a plane. This makes it particularly easy to find a shear web plane in which the shear web can deliver optimal load carrying properties.

According to an aspect of the disclosure, the reference line is arranged in the shear web plane or in a constant distance therefrom. This leads to an advantageous symmetry of the loads acting on the shear web.

According to an aspect of the disclosure, a distance between the shear web plane and the reference line varies, in particular such that the distance is larger in an outer longitudinal section of the rotor blade close to the tip than in an inner longitudinal section of the rotor blade close to the blade root. This allows optimizing the characteristics of the rotor blade when operating under load. For example, shifting of the aerodynamic profiles in the x-y plane with regard to the reference line in the outer longitudinal section may compensate for, for example, torsional moments building up over the length of the blade. This can help to lower the torque requirements of a pitch drive.

According to an aspect of the disclosure, the prebend is in a range from 0.5% to 8% of the blade length. This range turned out to be adequate with regard to the aim of preventing tower strikes.

According to an aspect of the disclosure, the sweep is in a range from 0.5% to 10% of the blade length. In particular, the sweep can be selected within this range and in dependency of the selected prebend.

BRIEF DESCRIPTION OF THE DRAWINGS

The invention will now be described with reference to the drawings wherein:

FIG. 1 shows a wind turbine rotor blade in a view on the trailing edge;

FIG. 2 shows the wind turbine rotor blade of FIG. 1 in a view on the pressure side;

DESCRIPTION OF THE PREFERRED EMBODIMENTS

Figure 3:
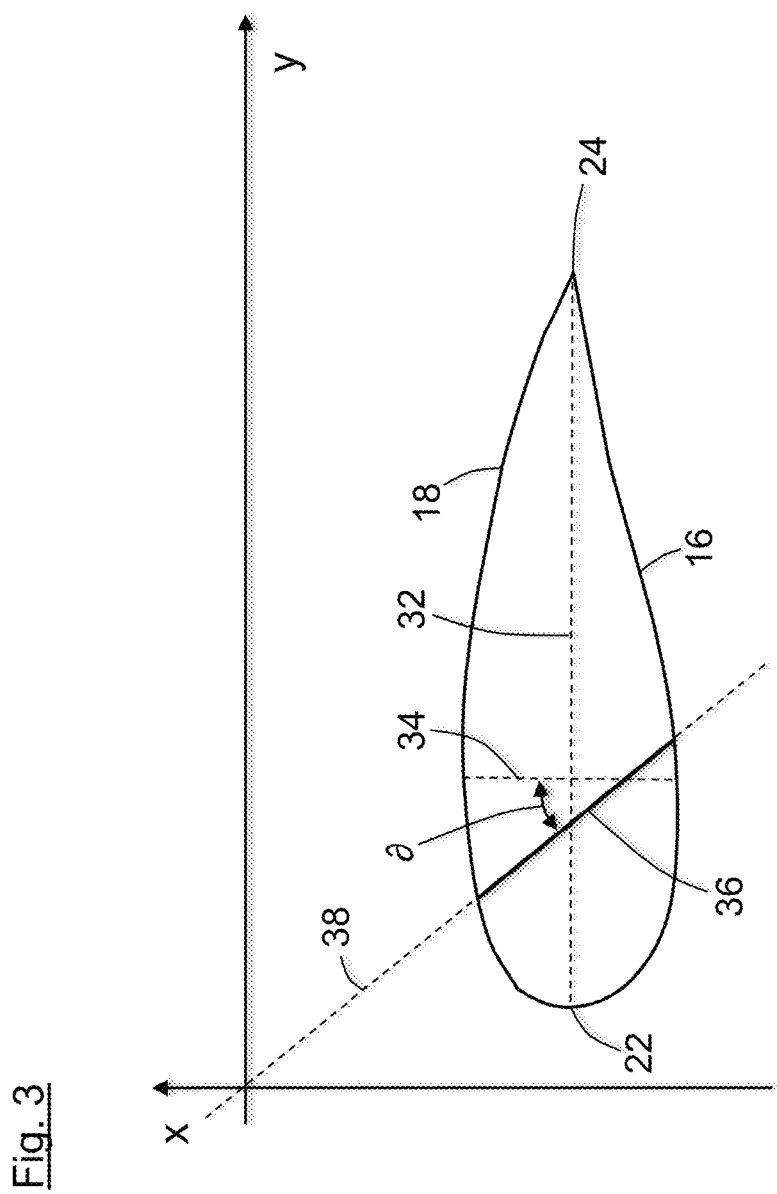
FIG. 3 shows the wind turbine rotor blade of FIGS. 1 and 2 seen in cross section at the dashed line denoted A-A in FIGS. 1 and 2.

The wind turbine rotor blade 10 in FIG. 1 is shown in a view along the −y direction. A trailing edge 22 (see FIG. 2) of the wind turbine rotor blade is facing the observer. The wind turbine rotor blade 10 has a blade root 12, a blade tip 14, a pressure side 16 and a suction side 18. A reference line 20 corresponding to the aerodynamic centers of the wind turbine blade's cross sections runs from the midpoint of the blade root 12, where the wind turbine blade's cross section is circular, to the blade tip 14. The blade root 12 defines a z-axis of the rotor blade 10, which is a line normal to the blade root 12 and pointing towards the tip region. The wind turbine rotor blade 10 has a length of approximately 90 m.

In the view of FIG. 1, one can see that the wind turbine rotor blade 10 as well as the reference line 20 have a prebend towards the pressure side 16 and along the direction of the x-axis. Accordingly, the blade tip 14 is offset from the z-axis in the −x direction by an x-offset 26 represented by a double arrow.

FIG. 2 shows the wind turbine rotor blade 10 in a view on the pressure side 16. The y-z plane shown in this figure roughly corresponds to a rotor plane, or to a tangent plane to a rotor cone if the z-axis is inclined with regard to the rotor axis. The wind turbine rotor blade 10 has a leading edge 22, a trailing edge 24, and, at a longitudinal position between 10% and 30% of the blade length, a shoulder 28 where the wind turbine rotor blade has its maximum chord length. The reference line 20 is closer to the leading edge 22 than it is to the trailing edge 24. One can see that the wind turbine rotor blade 10 has a sweep towards the trailing edge 24, so that the blade tip 14 is offset from the z-axis in the y-direction by a y-offset 30 represented by a double arrow.

FIG. 3 shows a cross section at the plane denoted A-A in FIGS. 1 and 2. The plane of this cross section is close to the blade tip 14. At this location, the wind turbine rotor blade 10 has an aerodynamic profile with a leading edge 22, a trailing edge 24, a pressure side 16 and a suction side 18. The aerodynamic profile has a chord 32 extending between the leading edge 22 and the trailing edge 24. This chord 32 defines the direction of the y-axis of the right-handed coordinate system xyz. The aerodynamic profile has a profile height 34 arranged in accordance with the x-direction.

A planar shear web 36 connects the pressure side 16 and the suction side 18. It is arranged in a shear web plane 38 which comprises the z-axis and is inclined with regard to the x-axis by an angle $\partial$ of about 30°.

Figure 4:
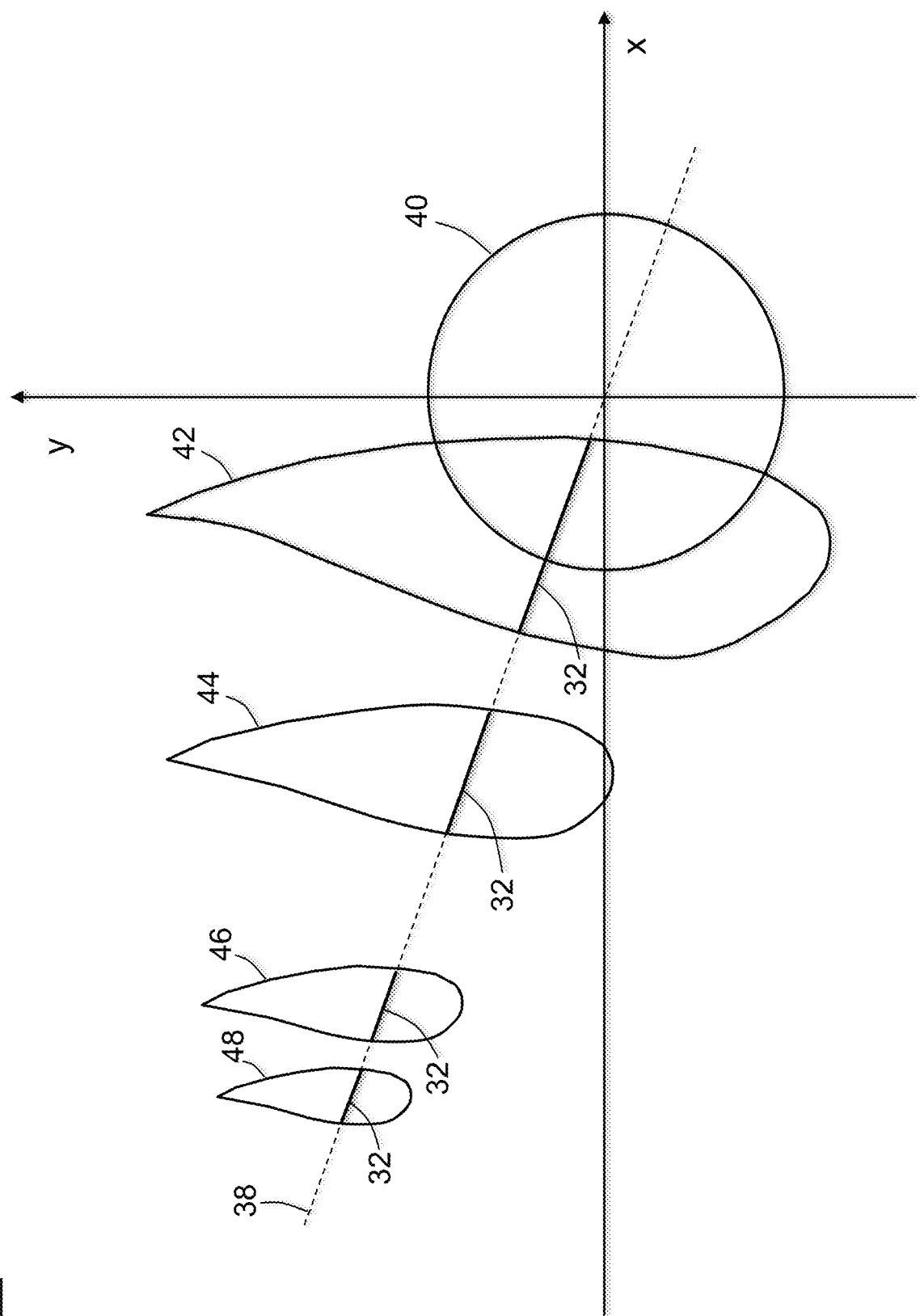
FIG. 4 shows a series of cross sections through the wind turbine rotor blade of FIGS. 1 to 3; and, FIG. 5 shows a cross section of another wind turbine rotor blade.

FIG. 4 shows the wind turbine rotor blade 10 in a series of cross sections in the xy-plane. First cross section 40 is located at the blade root 12, where the cross section is circular. Second cross section 42 is located at a longitudinal position of approximately 40 m (always measured from the blade root 12). Third cross section 44 is located at a longitudinal position of approximately 60 m, fourth cross section 46 is located at a longitudinal position of approximately 80 m, and fifth cross section 48 is located at a longitudinal position of approximately 85 m. The cross sections 42, 44, 46, and 48 each have an aerodynamic profile. One can see a slight twist of the wind turbine rotor blade 10, because the chord of the fifth cross section 48 is aligned with the y-axis, while the chord of the second cross section 42 is inclined with reference to the y-axis by a few degrees.

The shear web plane 38 comprises the z-axis and hence runs through the origin of the coordinate system. The shear web 36 can be seen in each of the cross sections 42, 44, 46, and 48, always arranged in the shear web plane 38.

The wind turbine rotor blade shown in cross section in FIG. 5 is similar to the wind turbine rotor blade 10 of the previous figures, similar elements are referenced with the same reference numerals. The load carrying structure of the wind turbine rotor blade of FIG. 5 differs in that it comprises a further shear web 50 placed parallel to the shear web 36. Also shown are two spar caps 52, each being integrated into one of the half shells. The shear web 36 and the further shear web 50 are both connected to each of the two spar caps 52.

It is understood that the foregoing description is that of the preferred embodiments of the invention and that various changes and modifications may be made thereto without departing from the spirit and scope of the invention as defined in the appended claims.

LIST OF REFERENCE NUMERALS 10 wind turbine rotor blade
12 blade root
14 blade tip
16 pressure side
18 suction side
20 reference line
22 leading edge
24 trailing edge
26 x-offset
28 shoulder
30 y-offset
32 chord
34 profile height
36 shear web 38 shear web plane
40 first cross section
42 second cross section
44 third cross section
46 fourth cross section
48 fifth cross section
50 further shear web
52 spar cap
∂ angle

What is claimed is:

1. A wind turbine rotor blade comprising:
a rotor blade body having a blade tip, a blade root for attachment to a rotor hub, a load carrying structure, and an aerodynamic shell;
said blade root defining a z-axis of a right-handed coordinate system;
said aerodynamic shell having a leading edge, a trailing edge, a pressure side, a suction side, and, at a longitudinal position close to said blade tip, an aerodynamic profile with a chord and defining a profile height;
said chord defining a direction of a y-axis of the right-handed coordinate system and said profile height defining a direction of an x-axis of the right-handed coordinate system;
said load carrying structure including a shear web connecting said pressure side and said suction side;
the wind turbine rotor blade having a prebend towards said pressure side such that said blade tip is offset from the z-axis along the direction of the x-axis;
the wind turbine rotor blade having a sweep towards said trailing edge such that said blade tip is offset from the z-axis along the direction of the y-axis;
said shear web being a planar shear web defining a shear web plane;
said shear web plane including the z-axis or having a constant distance therefrom;
said shear web plane being inclined with regard to the x-axis; and,
said shear web extending over a large part of a length of the wind turbine rotor blade, including a longitudinal section having said sweep and said prebend.

2. The wind turbine rotor blade of claim 1, wherein said shear web plane defines an angle (δ) with the x-axis in a range of 10° to 45°.

3. The wind turbine rotor blade of claim 1, wherein the wind turbine rotor blade has one or more further shear webs, wherein each of said further shear webs is planar and arranged in a plane parallel to said shear web plane.

4. The wind turbine rotor blade of claim 1, wherein the aerodynamic shell includes a suction side half shell and a pressure side half shell.

5. The wind turbine rotor blade of claim 1, wherein said load carrying structure includes two spar caps connected to each other by said shear web.

6. The wind turbine rotor blade of claim 5, wherein said spar caps are integrated into said half shells.

7. The wind turbine rotor blade of claim 1, wherein a reference line of the wind turbine rotor blade extends from said blade root to said blade tip within said aerodynamic shell and has a sweep and a prebend; and, the reference line is a planar curve.

8. The wind turbine rotor blade of claim 1, wherein a reference line of the wind turbine rotor blade extends from said blade root to said blade tip within said aerodynamic shell and has a sweep and a prebend; and, the reference line is arranged in said shear web plane or at a constant distance therefrom.

9. The wind turbine rotor blade of claim 1, wherein a reference line of the wind turbine rotor blade extends from said blade root to said blade tip within said aerodynamic shell and has a sweep and a prebend; and, a distance between said shear web plane and the reference line varies.

10. The wind turbine rotor blade of claim 1, wherein a reference line of the wind turbine rotor blade extends from said blade root to said blade tip within said aerodynamic shell and has a sweep and a prebend; and, a distance between said shear web plane and the reference line varies such that the distance is larger in an outer longitudinal section of the wind turbine rotor blade close to said blade tip than in an inner longitudinal section of the wind turbine rotor blade close to said blade root.

11. The wind turbine rotor blade of claim 1, wherein the wind turbine rotor blade defines a blade length; and, said prebend of the wind turbine rotor blade is in a range from 0.25% to 8% of said blade length.

12. The wind turbine rotor blade of claim 1, wherein the wind turbine rotor blade defines a blade length; and, said sweep of the wind turbine rotor blade is in a range from 0.25% to 10% of the blade length.

* * * * *